(12) United States Patent
Weiss

(10) Patent No.: US 7,346,654 B1
(45) Date of Patent: Mar. 18, 2008

(54) VIRTUAL MEETING ROOMS WITH SPATIAL AUDIO

(75) Inventor: Michael Weiss, Ottawa (CA)

(73) Assignee: Mitel Networks Corporation, Ontario (CA)

( * ) Notice: Subject to any disclaimer, the term of this patent is extended or adjusted under 35 U.S.C. 154(b) by 0 days.

(21) Appl. No.: 09/547,368

(22) Filed: Apr. 11, 2000

(30) Foreign Application Priority Data

Apr. 16, 1999 (GB) ................................ 9908576.3

(51) Int. Cl.
*G06F 15/13* (2006.01)

(52) U.S. Cl. ...................... 709/204; 709/203; 709/205; 345/753

(58) Field of Classification Search ........ 709/202–205, 709/231; 379/202.1; 345/753
See application file for complete search history.

(56) References Cited

U.S. PATENT DOCUMENTS

| | | | |
|---|---|---|---|
| 5,347,306 A | | 9/1994 | Nitta |
| 5,491,743 A | | 2/1996 | Shiio et al. .................. 379/202 |
| 5,889,843 A | * | 3/1999 | Singer et al. .......... 379/202.01 |
| 6,304,648 B1 | * | 10/2001 | Chang ................... 379/202.01 |
| 6,408,327 B1 | * | 6/2002 | McClennon et al. ........ 709/204 |
| 6,457,043 B1 | * | 9/2002 | Kwak et al. ................ 709/204 |
| 6,545,700 B1 | * | 4/2003 | Monroe ................... 348/14.08 |
| 6,559,863 B1 | * | 5/2003 | Megiddo .................... 345/753 |
| 6,608,636 B1 | * | 8/2003 | Roseman .................... 345/753 |

FOREIGN PATENT DOCUMENTS

| | | |
|---|---|---|
| EP | 0663771 A | 7/1995 |
| EP | 0696018 A | 2/1996 |
| JP | 10056626 A | 2/1998 |
| WO | WO 9510158 | 4/1995 |
| WO | WO 9733450 A | 9/1997 |
| WO | WO 9740461 A | 10/1997 |

OTHER PUBLICATIONS

Search Report of Great Britain Application No. 9908576.3, Jul. 8, 1999.

* cited by examiner

*Primary Examiner*—Nathan Flynn
*Assistant Examiner*—Jinsong Hu
(74) *Attorney, Agent, or Firm*—F. Chau & Associates, LLC

(57) ABSTRACT

A system for conducting a virtual audio-visual conference between two or more users comprising two or more client stations each acting as a signal source and destination for each respective user, having a user interface for audio-visual input and output including audio signal reception and generation means for receiving and generating audio signals, one or more servers, and a network coupling the client stations and the servers, wherein each user is represented as a corresponding movable visual symbol displayed on the user interfaces of all coupled client stations and the audio signal of all users is generated at each client station with an attenuation according to the spatial position of the respective symbols on the user interfaces and according to the direction in which each movable visual symbol of each signal source is oriented on the user interface.

13 Claims, 9 Drawing Sheets

Creating a stepped attenuation function by dividing the real-time distance into intervals, which are then mapped to a constant level of attenuation each

VIRTUAL MEETING ROOMS WITH SPATIAL AUDIO

FIELD OF THE INVENTION

This invention relates generally to the field of remote audio-visual conferencing and more specifically to a method and system for conducting virtual conferences with spatial audio.

BACKGROUND OF THE INVENTION

Telephony conference calls are well known in the art. The most common type of conference call involves two or more users connected over a telephone line carrying on a multi-person conversation. Such conference calls are audio only with no visual representations. Algorithms such as loudest caller (D. L. Gibson et al., "Unattended Audioconferencing", BT Technology Journal, vol. 14, no. 4, October 1997) are used to generate audio, but unfortunately do not provide naturalistic representations of the speakers' voices.

There is also known in the art conferencing applications that provide a limited visual representation of the conference. In one form of conferencing application, a simple list of the participants is displayed. The information provided to a participant is limited to merely the state of the conference call. Also, in the prior art, IBM has disclosed a conferencing application, known as IBM Java Phone which provides a limited visual representation of a conference. However, all of the above conferencing applications suffer from a lack of realistic sound reproduction because they do not consider a spatial or directional relationship between the participants. Furthermore, they fail to provide a sense of "presence" or to consider the relative position of the participants. They also do not provide a visual indication of which participants are currently online before the conference call is initiated. In these prior art systems, the initiator of a conference call must "set up" the conference call which includes explicitly specifying, locating and contacting prospective participants beforehand and then joining them to the conference call.

The use of the computer networks such as the Internet for conferencing is also known in the art. Personal computer based Internet telephony applications such as Microsoft Netmeeting provide both an audio and visual component to conferencing. However, products such as Microsoft Netmeeting still suffer from the drawback that the initiator must still contact each participant ahead of time using a regular phone to ensure that all parties are at their desks and willing to participate in the conference call. Such products still suffer from poor audio and visual quality and limited conference control.

A prior art alternative to conference calls where the call must be previously arranged is the computer chat room. A multi-user computer chat room is a virtual meeting place commonly experienced by users of both the Internet and intranets providing a means for establishing and maintaining formal contacts and collaboration. In a chat room, people assume virtual identities, which are generally known as avatars. Chat rooms can be connected to other such rooms allowing people to move from room to room, participating in different conversations. Any person in a room can talk to another person in the same room and conversations among users do not need to be announced although public and private conversations are allowed. One particular standard for the implementation of chat rooms is Internet Relay Chat (IRC). In the evolution of the technology, the prior art has developed three-dimensional multi-user rooms in which participants are represented by realistic renderings of people. Up until recently, communication in these virtual worlds has been limited to text.

The current standard for three-dimensional virtual meeting places, VRML (Virtual Reality Markup language), has evolved to include sound sources as is described in VRML 2.0. San Diego Center's VRML Repository at http://sdsc.edu/vrml/ also has provided examples of the use of chat rooms and the VRML standard. One of the major difficulties with the inclusion of sound is delivering a realistic continuous sound signal to the participants. The sound signal should sound "live", rather than delayed or pre-recorded to facilitate interactive communication. The sound of prior art systems and methods is typically of poor quality and unrealistic. A further problem is that there is very little correlation between the visual representation and the audio presentation. The prior art chat rooms and virtual meeting place systems suffer from the same problems discussed above for audio conferences, in that they do not provide realistic sound replication and do not consider the visual position of the speaker relative to the listener when rendering the audio.

No work had been performed on combining the technology of virtual meeting places with audio which presents sound from all sound sources in their spatial configuration with respect to each participant.

SUMMARY OF THE INVENTION

The present invention provides a system and method in which users can set up voice conferences through a visual representation of a meeting room. The inventive system and method provides both a visual sense of presence as well as a spatial sense of presence. One feature of a visual sense of presence is that the participant is provided with visual feedback on the participants in the conference. One feature of a spatial sense of presence is that a conference does not need to be prearranged. A further feature of the spatial sense of presence is that a person can be located by sound. The audio stream emanating from the speaker is attenuated to reflect the spatial distance between the speaker and the listener and also contains a directional component that adjusts for the direction between the speaker and the listener. In the inventive system and method, users can engage in a voice interaction with other users which are represented on the user interface through visual representations, symbols or avatars. The model of interaction (sometimes known as the "cocktail party" model) provides navigational cues through pieces of conversations close in virtual space that can be eavesdropped. As a participant moves through a virtual meeting place, he or she can "browse" conversations and participate in those of interest. Each participant receives a different sound mix as computed for the position of his or her avatar in virtual space with respect to the others. Thus, audio is presented to each participant that represents the sound generated from all sources in their spatial relationship with respect to each participant.

Avatars can join a conversation (and leave another) by moving the avatar from the current group to another through virtual space.

In one aspect of the present invention there is provided a system for conducting a virtual audio-visual conference between two or more users comprising:

a) two or more client stations each acting as a signal source and destination for each respective user, having a user interface for audio-visual input and output including audio signal reception and generation means for receiving and generating audio signals;

b) one or more servers; and c) a network coupling said client stations and said servers; wherein each user is represented as a corresponding movable visual symbol displayed on the user interfaces of all coupled client stations and the audio signal of all the users is generated at each client station attenuated according to the spatial position of respective symbols on the user interfaces.

In another aspect of the present invention there is provided a method for generating a spatial audio signal in a virtual conference presented on an audio-visual device comprising the steps of: a) locating the position of a sound generating participant in a virtual conference; b) locating the position of a listening participant in the virtual conference; c) calculating the signal strength of the signal received from the generating participant at the position of the listening participant based upon the distance between the sound generating participant and the listening participant; and d) generating an output signal corresponding to the calculated signal strength.

BRIEF DESCRIPTION OF THE DRAWINGS

FIG. 10B is a representation illustrating the attenuation at point b with regard to a sound source at point a.

DESCRIPTION OF THE PREFERRED EMBODIMENT

Figure 1:
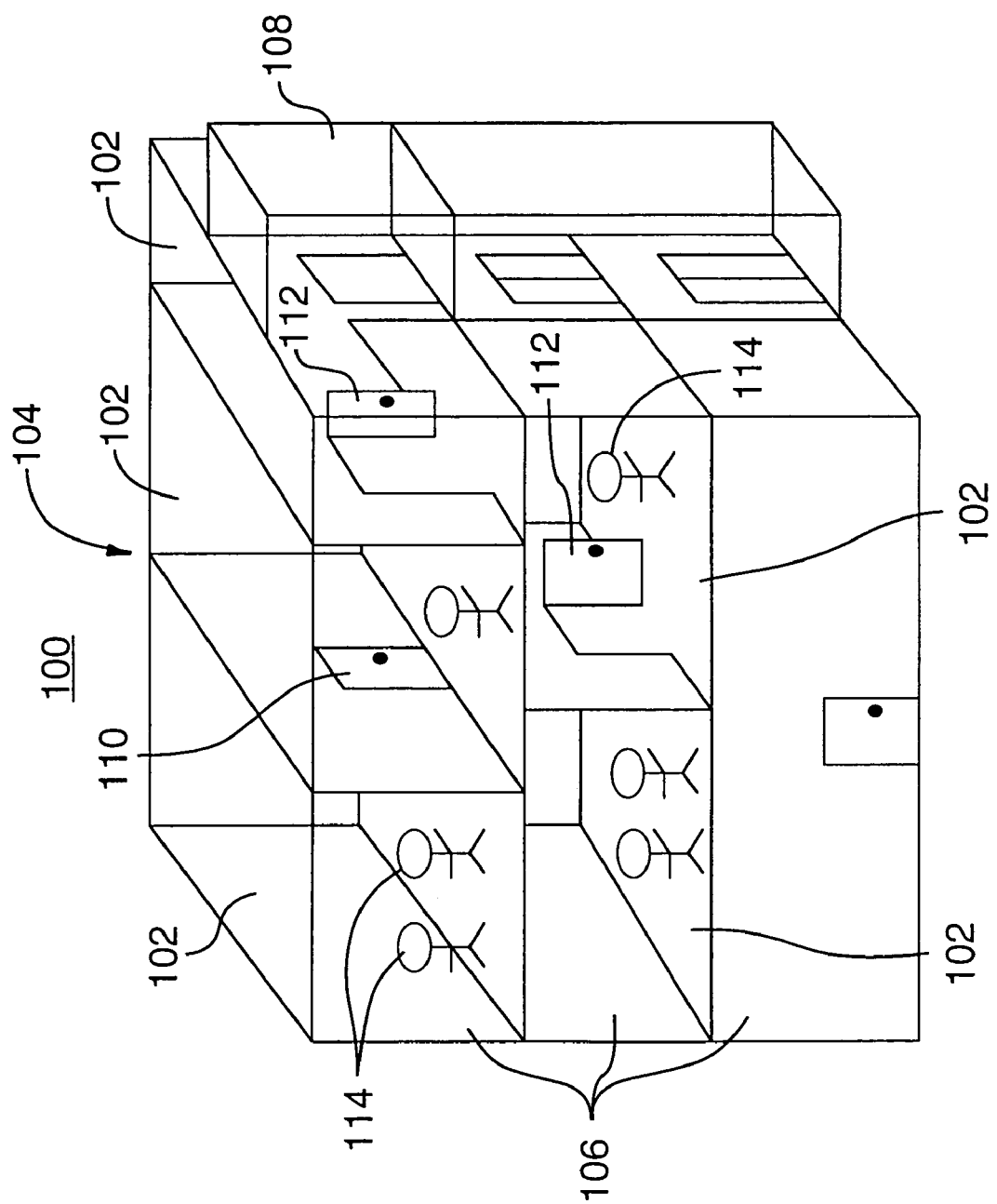
FIG. 1 is a representative overview diagram of a virtual world of the present invention.

Turning to FIG. 1, a virtual world 100 may depict some imaginary place or model of an aspect of the real world. The virtual world 100 has a number of meeting places where participants can interact. In a preferred embodiment, a meeting place consists of a number of connected rooms 102 which may themselves be part of virtual building 104. The buildings can have a number of floors 106 and movement through the building can be facilitated by an elevator 108. The rooms 102 are connected by doors 110 and 112. Open doors 112 indicate that the voices from one room can be heard in neighboring rooms. People interacting in the virtual world 100 are represented by symbols or avatars 114 and can move around the virtual world 100. Groups of people in a room 102 can have conversations.

Overlapping boundaries between conversations enables eavesdropping from one conversation to another with the intensity of the sound emanating from a conversation dropping off with the distance from the other participants as described with respect to the Figures below.

An avatar 114 can join or leave a conversation as the participant changes the location of the avatar 114 in the virtual meeting room 102. Eavesdropping occurs when a participant represented by avatar 114 listens to a conversation different from the one in which it is currently engaged. Also, a participant represented by an avatar would also be eavesdropping where it does not take part in any conversation. Joining or leaving a conversation is achieved by moving the avatar 114 from one participant or group of participants represented by avatars 114 to another through the virtual world 100. In addition, eavesdropping can be restricted to specific participants in order to support sidebar conversations or a "cone of silence" (conversations restricted to only a specific subset of participants represented). This is described in further detail with respect to FIG. 12.

Figure 2:
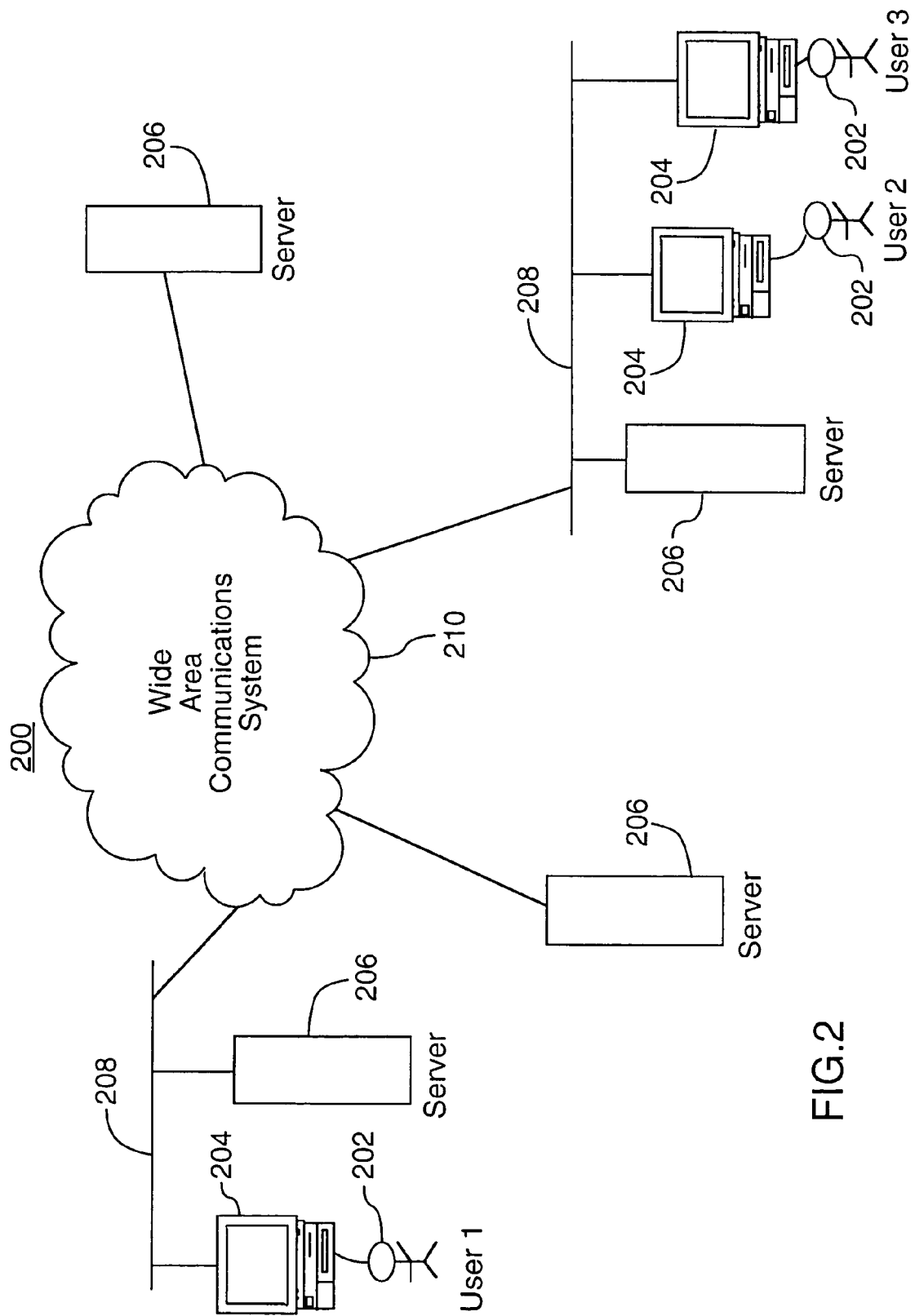
FIG. 2 is a representative block diagram of a communication system for implementing the virtual world of the present invention with spatial audio.

Turning to FIG. 2, a communication system 200 embodying the present invention is shown. The example shown in FIG. 2 is a client server architecture, although the invention can easily be modified to operate on a single stand-alone machine using a graphical terminals or interface. Users 202 interface with client stations 204 to participate and communicate with other users 202. Client stations 204 are communications devices or personal computers such as are well known in the art with graphical user interfaces and may include a keyboard, a pointing device such as a mouse, or joystick, an audio system with microphone and speakers or headphone. In a preferred embodiment, client stations 204 are personal computers running an operating system such as Windows 95 from Microsoft although other operating systems and graphical use interfaces such as are well known in the art could be used. In the preferred embodiment, client stations 204 connect to servers 206 through local area networks 208. Servers 206 can be any appropriate commercially available software and hardware devices such as are well known in the art. In a preferred embodiment, server 206 is an Intel processor based network server from Compaq Computers running the Windows NT operating system from Microsoft. The local area networks 208 can be based on Ethernet or any other commercially available local area network. Local area networks 208 can be interconnected through a wide area communication system 210 which may also be an ATM network or a network of any other type that allows for client stations 204 to connect to server 208. Servers 208 are also optionally connected to peripheral devices such as printers and may have connections to other systems and devices, including both voice systems and data systems, in the outside world. The method and system of the present invention is typically implemented using software running on client stations 204 and servers 206.

Figure 3:
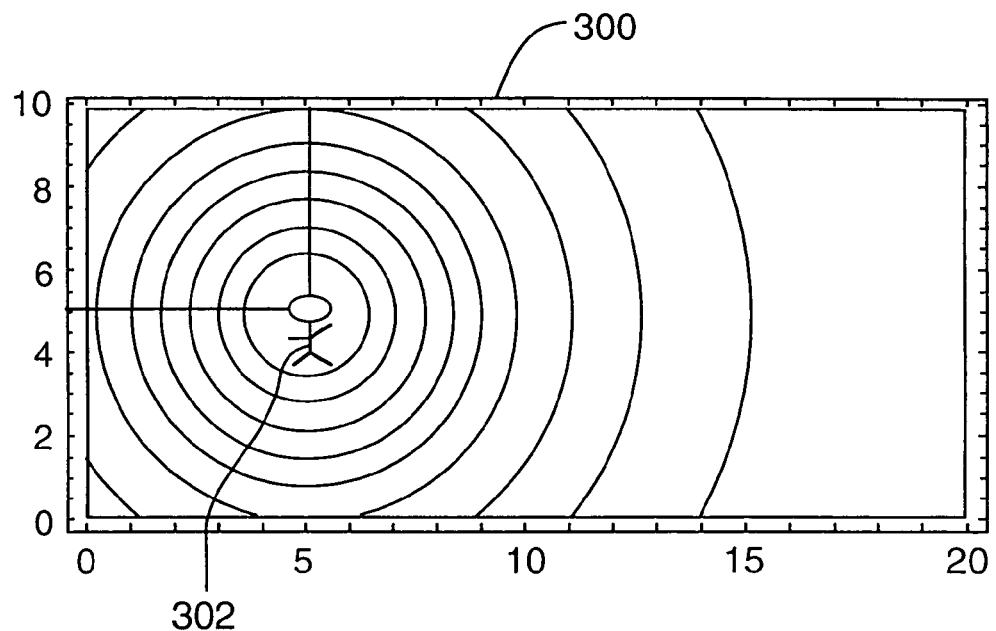
FIG. 3 is a representation of a contour plot using a uniform model of sound distribution with one person in a virtual meeting room.

Turning to FIG. 3, an illustration of sound intensities assuming a uniform distribution of sound emanating from an avatar 302 in a meeting room 300 is shown. An x-y grid can be superimposed on the meeting room to identify each point in the room. A formula to compute the intensity of sound distribution of a point source at a point (x,y) of the signal of a sound source located at $(x_0,y_0)$, (assuming A is the initial intensity at which the source is generating sound signals and $\lambda$ determines how fast the intensity decays) can be approximated by an inverse square function:

$$I(x, y) = \frac{A}{\lambda((x-x_0)^2 + (y-y_0)^2) + 1}$$

Intensity and A may be measured in any appropriate units, such as decibels.

FIG. 3 shows a contour plot of such a sound distribution where $\lambda=0.05$. In FIG. 3 the sound source (avatar 302) is located at point (5,5) in virtual room 300 with dimensions of 20×10 units, and generates sound signals with an initial intensity A equal to 3. In FIG. 3, the white area on the plot corresponds to highest intensity, and as the grey level darkens, the intensity drops to 0.0.

Figure 4:
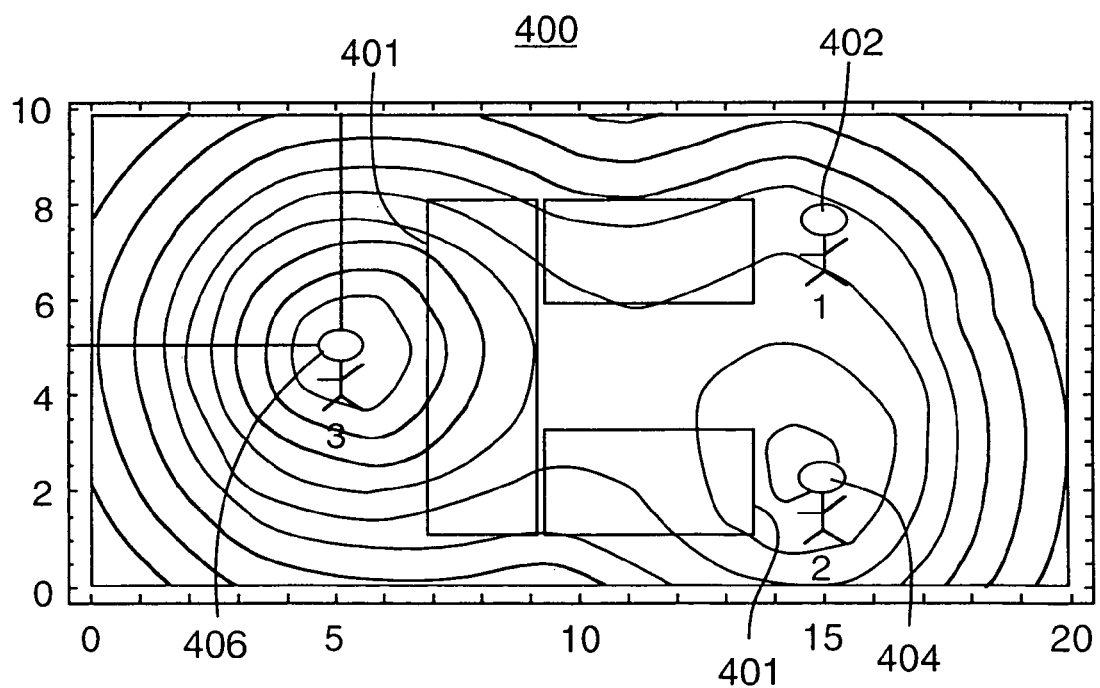
FIG. 4 is a representation of a contour plot using a uniform model of sound distribution with three people in a virtual meeting room.

Turning to FIG. 4, an illustration of a more complex room 400 containing three avatars 402, 404 and 406 is shown. Avatars 402, 404 and 406 are illustrated with locations as indicated in Table 1. This scenario illustrates a typical meeting room with a three avatars grouped around a set of tables 401.

TABLE 1

|  | Location $(x_0, y_0)$ | Intensity A |
| --- | --- | --- |
| Avatar 402 | (15,8) | 1.0 |
| Avatar 404 | (15,2) | 2.0 |
| Avatar 406 | (5,5) | 3.0 |

In the example of FIG. 4, avatar 402 generates a signal with intensity 1.0, avatar 404 generates a signal with intensity 2.0, and avatar 406 generates a signal with intensity 3.0.

The total intensities and the contributions from each individual avatar 402, 404 and 406 at each location are shown in Table 2. Each avatar 402, 402, 406 hears the sound contributions of the other avatars. The contribution of each avatar is calculated using the formula described with respect to FIG. 3 where the point (x, y) is the position of the avatar hearing the sound, and the point $(x_0, y_0)$ and A are the location and intensity respectively, of the avatar generating the sound. The total intensity is the sum of the contributions of each avatar. The total intensity at any point represents the sound that would be heard by the avatar at that point, and would be the audio output through the speaker or headset of the participant represented by that avatar at the participant's client station.

In FIG. 4, using the formula previously described with respect to FIG. 3, the sound intensity or spatial audio for the entire virtual room can be calculated. For example, the intensity around the point (10,5), is 2.4. Towards the middle side of the room, at location at point (10,2) it is 2.2. And in the left lower corner, at location (0.0), the intensity is at 1.1.

TABLE 2

|  | Total intensity | Contributed from avatar 1 (402) | Contributed from avatar 2 (404) | Contributed from avatar 3 (406) |
| --- | --- | --- | --- | --- |
| Avatar 1 (402) | 2.1794 | 1.0 | 0.714286 | 0.465116 |
| Avatar 2 (404) | 2.82226 | 0.357143 | 2.0 | 0.465116 |
| Avatar 3 (406) | 3.46512 | 0.155039 | 0.310078 | 3.0 |

Figure 5:
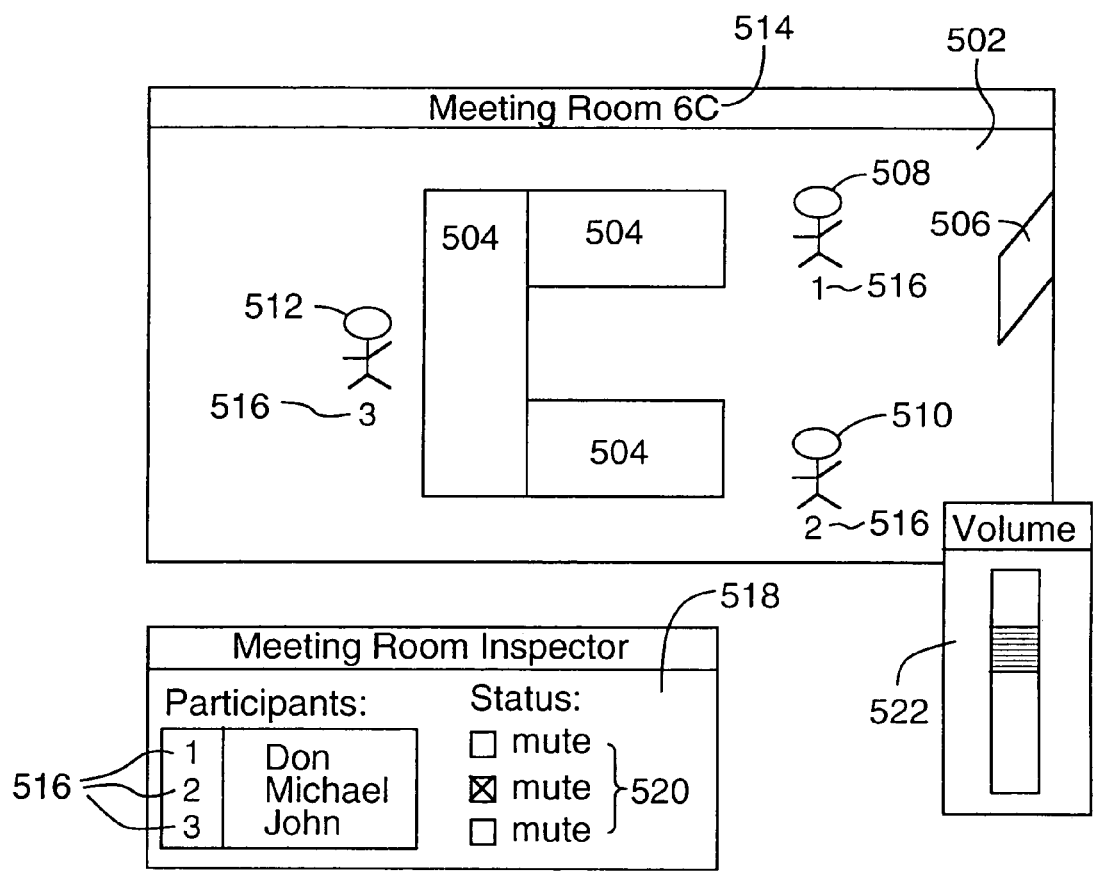
FIG. 5 is a representation of a user interface depicting a virtual meeting room.

Turning to FIG. 5, an example of a user interface 500 of a client station 204 of FIG. 2 is shown. As discussed with respect to client station 204 of FIG. 2, each user interface 500, includes a screen, and input/outputs means such as a mouse, keyboard, CPU and audio input/output device such as speakers and a microphone. The user interface 500 could operate on any typical graphical computing environment, such as Windows 95, X Windows or graphical terminal. The user interface 500 could be programmed in software in any suitable, well known computing language for execution on client station 204 of FIG. 2. The "Meeting Room" window 502 shows the location of the facilities (tables 504, doors 508, etc.) in the meeting room and the representations of the participants in the meeting room (avatars 508, 510, and 512). The window title 514 also indicates the name of the room. Participants are identified by a participant identifier 516, such as a number that appears the list in the "Meeting Room Inspector" window 518. Alternatively, photographs of the participants, or the names of the participants if the space on the window allows, could be used to represent the participants.

Each participant can move in virtual space by repositioning its avatar 508, 510, 512 with the pointing device. The participant might also change the orientation of its Avatar 508, 510, 512, if instead of the point source model of sound, a directional sound model is employed as further described with respect to FIGS. 7 to 10.

The "Meeting Room Inspector" window 518 provides the means to view the progress of the conference. The window 518 presents a list of the names of the current participants and matches them up with the participant identifier 516 used in "Meeting Room" window 502. It can also provide settings control such as mute control 520 for adjusting the environment such as muting a participant. Through the mute control 520, a user can instruct the system not to output audio from a participant, although the participant's Avatar might be within audible distance. This control feature can be used when the participant at user interface 500 does not want to listen to another participant (for example—the other participant is noisy, makes obscene remarks etc.).

Similarly, the participant at user interface 500, which would be represented by a participant identifier 516 in meeting room inspector window 518 may also wish that all other participants not hear what is going on locally. By selecting mute control 520 corresponding to the participant identifier 516 for the participant at user interface 500, that participant can prevent local audio from going to the other participants, thereby performing a form of call screening.

In an alternate embodiment, not shown, a similar control window to the meeting room inspector window could be used to selectively choose which participants can hear regular audio. By selecting the appropriate settings, a participant can tell the system which other participants are to hear the audio. This is a way of implementing a sidebar conversation as described in further detail with respect to FIG. 12. Finally, the user interface 500 has a volume control window 522 by which the user can modify the intensity of its signal, for example, to compensate weak line transmission.

Figure 6:
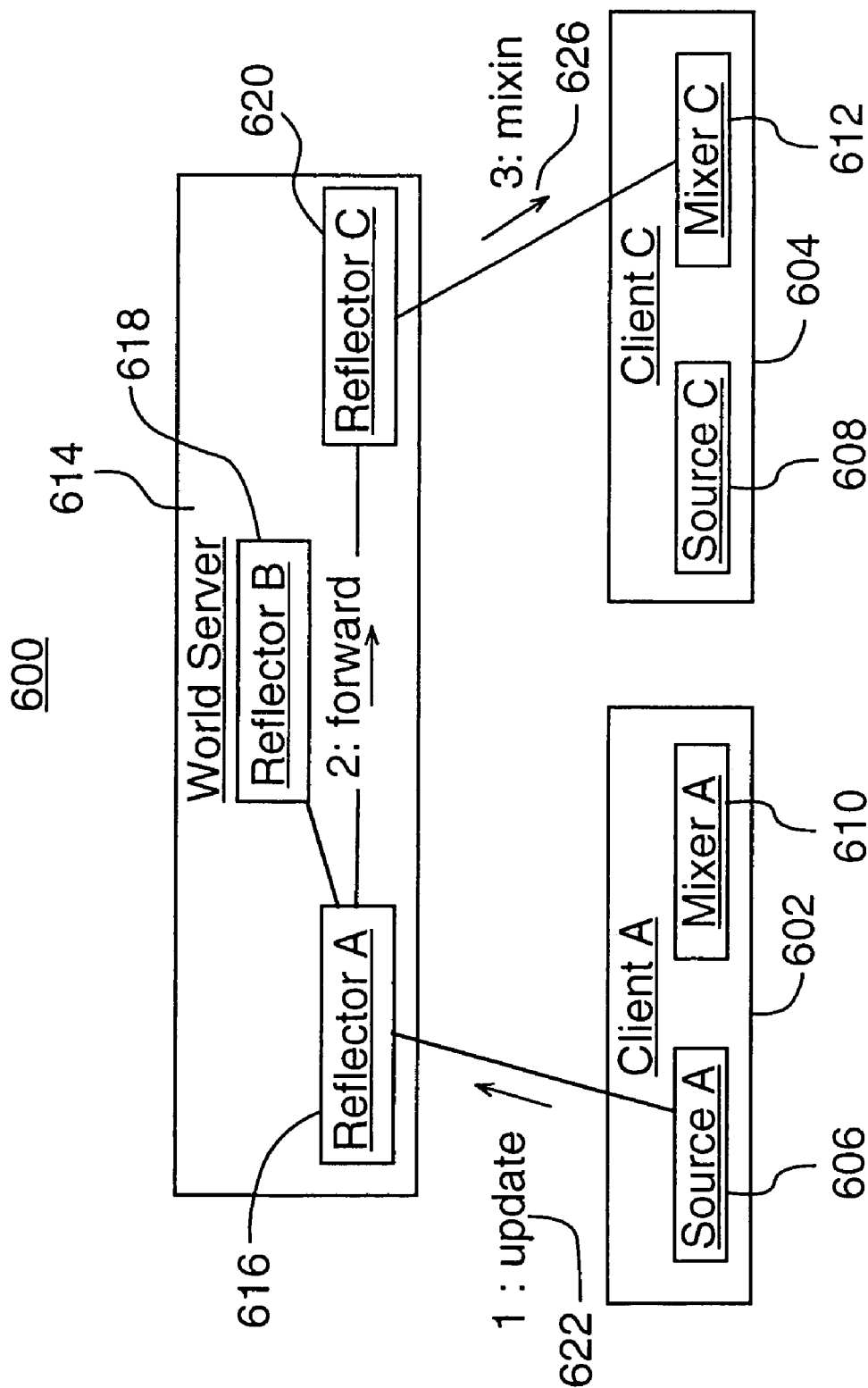
FIG. 6 is a software architecture for implementing the present invention.

Turning to FIG. 6, an example of a software architecture 600 for message flow between the components of the communication system 200 of FIG. 2 of the present invention is shown.

The architecture 600 shows a configuration with three participants, A,B, and C where client subsystems 602 and 604 for participants A and C only are shown in full. Client subsystems 602 and 604 are run on the client stations 204 of FIG. 2 with each participant represented as an avatar on the user interface of each client station. Each participant has a corresponding client subsystem (602, 604) within its client station which consists of a source 606 and 608 and a mixer 610 and 612 respectively. The source 606,608 is a software module that receives audio input from a microphone by calling the sound card driver API on the client station. The source 606, 608 receives the audio input from the participant and generates a stream of audio updates together with information on the current location of the participants. The mixer 610, 612 is a software module that receives audio streams and location information from the other client subsystems and integrates and synchronizes the audio streams as described below.

Client subsystems 602 and 604, of which the mixers 610, 612 are a part, do not interact with each other directly but send their updates to a world server 614 which then dispatches them to the appropriate client subsystems 602 and 604. The world server 614 is typically run as a software module on a server 208 of FIG. 2. In addition to providing audio services, world server also provides the necessary communications management of the graphics signals in a manner such as is well known in the art to support the user interface if each participant, as discussed with respect to FIG. 5. Communication is facilitated by packets passed between client subsystem 602,604 and world server 614. Each client subsystem 602, 604 is represented by its own thread (reflector) in the world server 614 that handles updates from its client subsystem and forwards updates to the other reflectors 616, 618 and 620 in the world server 614. For each client there is a corresponding reflector 616, 618 and 620 in world server 614.

In an alternate embodiment, (not shown) the world server could be separated from the system or server providing the graphical representation of the virtual world. In this manner, the present invention can used to extend a prior art virtual world, such as VRML with the world server 614 of the present invention dedicated to carrying the voice traffic between the participants. This significantly enhances the performance of existing systems, which are based on sharing the same LAN or Internet for data and voice traffic.

An example of the typical message flow between client subsystems 602, 604 and world server 614 can be illustrated as follows:

1. Client subsystem 602 (A) updates its input audio stream 622 and sends a packet to the world server 614 together with the location of the participant.
2. Reflector 616 (A) receives the update packet and forwards it to all other reflectors, namely reflector 618 (B) and reflector 620 (C).
3. Reflector 620 (C) sends a request 626 to mixer 612 (C) to mix in the update packet into its output audio stream. Mixer 612 (C) synchronizes the audio packet with the other audio packets it has received but not yet played and adds the audio streams locally. Reflector 618 (B) similarly requests Mixer B (not shown) to mix in the update and Mixer B acts on it.

The software architecture 600 illustrated above is only one preferred embodiment where the invention may be deployed in which audio processing is distributed among clients. Alternative embodiments, not shown, are possible where all software modules, except for the client display and client-side audio streaming, but including audio attenuation and mixing for each client, could run on a central multipoint control unit (MCU) on a server of FIG. 2. The choice whether to centralize or distribute the processing is based simply on practical considerations such as the processing power required for real-time audio processing, communications speed, etc., and does not affect the essence of the invention. For example, an alternate embodiment of the invention in an architecture using the H.323 standard for IP-based audio and video communication services in local area networks could be used. In this alternate embodiment, the present invention is deployed using a multipoint control unit (MCU) that supports conferences between three or more endpoints. The MCU consists of a Multipoint Controller (MC) and several Multipoint Processors (MP) deployed similarly to client stations. All endpoints send audio streams to the MCU in a peer-to-peer fashion. The MP performs the mixing of the audio streams and sends the resulting streams back to the participating terminals or client stations.

In an alternate embodiment, to reduce the load on the network, the world server 614 will actually choose not to forward an audio packet if the participants are too far apart or they are not in sight-line (as shown on the user interface) and to aggregate audio packets from nearby participants when forwarding an audio packet to "remote" participants. Participants can also be excluded from a conversation to create a sidebar conversation or cone of silence as described in further detail with respect to FIG. 12.

This alternate embodiment is an optimization to reduce the amount of packets sent across the network. Given the way by which the world server 614 can determine the distance between two avatars and that the corresponding sound attenuation is below some threshold, the world server 614 can chose not to forward an audio packet. Similarly, it can suppress an audio packet, if there is an obstacle shown on the user interface (such as a wall) between the avatars that would prevent the propagation of sound between them.

Returning to FIG. 6, the synchronization technique used to align the audio packets arriving at mixers 610 and 612 (originating from different instances of the same message flow) is based on standard techniques for compressing and expanding audio packets, for example, as described in U.S. Pat. No. 5,784,568. Each audio packet contains an identifier and a sequence number. The identifier uniquely identifies its source and the sequence number allows the mixers 610 and 612 to drop and/or interpolate between packets.

The mixers 610 and 612 use the location information in each of the update message packets to determine the audio signal to be delivered to each participant. Using the computation procedure described with respect to FIGS. 3 and 4 for a uniform distribution, or FIGS. 8 to 11 for a directional distribution, the mixers 610 and 612 calculate and determine the signal strength by attenuation of the audio signal to simulate the drop in intensity. In a preferred embodiment, all computation is done locally at the mixers 610 and 612 to minimize the computational load of the world server 614.

An example of the attenuation of the signal strength is described below. The procedure can easily, with obvious modifications, be applied to a directional distribution sound model. If the location information for the sending Source S as indicated in the update message is $(x_S, y_S)$ and the current location of receiving Source R is $(x_R, y_R)$, the audio signal is attenuated by the following factor A:

$$A(x_R, y_R) = I(x_R, y_R)/A_S = \frac{1}{\lambda((x_R - x_S)^2 + (y_R - y_S)^2) + 1}$$

using the formula for the intensity of a sound source described with respect to FIGS. 3 and 4. In the formula for the intensity we need to substitute (x0,y0) by $(x_S, y_S)$ and A by $A_S$.

Figure 7:
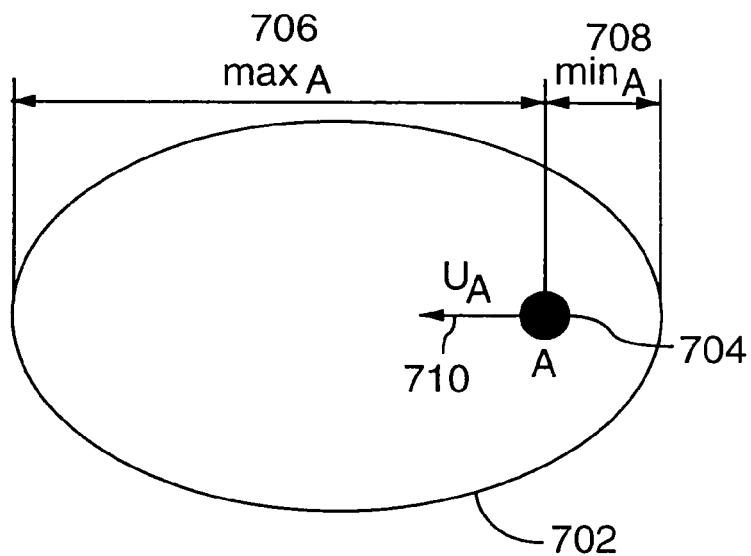
FIG. 7 is a representation of sound distribution using a directional model for one person in a meeting room.

Turning to FIG. 7, an alternate embodiment of the present invention illustrating a directional sound source is shown. The implementation of a directional sound source as an alternative to the uniform model of FIGS. 3 and 4 for calculation of the sound intensity provides improvements in quality and realism. As previously described, the examples of FIGS. 3 and 4 use a uniform model of sound propagation, that is, the sound intensity drops off as the radial distance from the participant increases. A more realistic model is to model participants as directional sound sources.

In a directional source model, the range of the sound emitted by each participant can be approximated by an ellipse. As shown in FIG. 7, the ellipse 702 is defined by the origin of the sound source 704 (point A), which coincides with a focus of ellipse 702, the forward range 706 ($max_A$) from the sound source, and the backward range 708 ($min_A$), and its orientation in space, that is, the directionality of the sound, as indicated by the unit vector 710 ($u_A$). The sound intensity drops proportionally to the square of the real-time distance (that is, distance normalized to a value between 0 and 1) from the sound source. Mathematically, the intensity never actually drops to 0. However, at some distance the intensity will drop below the audibility threshold. We thus select the decay factor $\lambda$ such that the attenuation at the boundary of the ellipse will bring the intensity below a user-defined audibility threshold. This threshold may be a parameter that the user or administrator can set through the graphical user interface to calibrate the system. We can select a value of $\lambda$ such that at the boundary of the ellipse, the intensity will be $1/N^{th}$ of the initial intensity. This is described in further detail with respect to FIGS. 10A and 10B.

Figure 8:
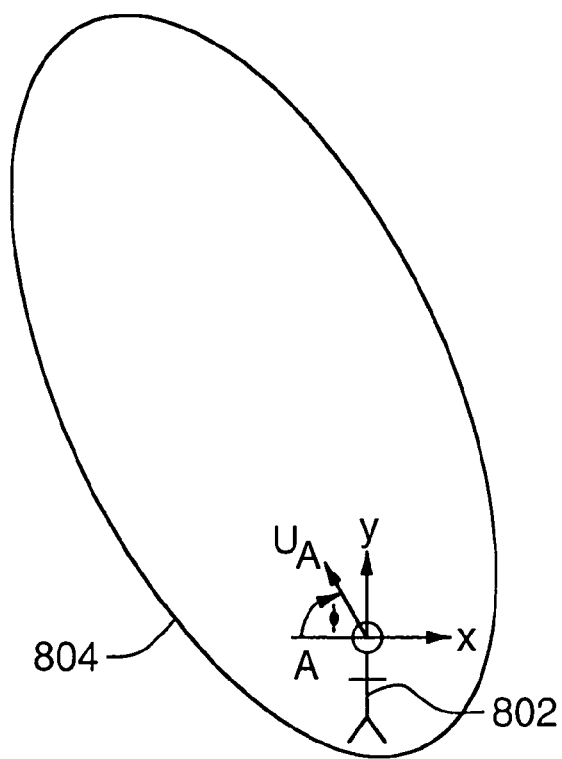
FIG. 8 is a representation of sound distribution for one person where the angle of direction of the sound is illustrated.

Turning to FIG. 8, an example illustrating the angle of directionality of sound from a participant is shown.

The participant A is represented by avatar 802 on a graphical display device. The orientation of the avatar 802 can be defined by a unit vector $u_A$ rooted in a focus of an ellipse 804 that describes the sound distribution superimposed over avatar 802. The focus of ellipse 804 coincides with the origin of the sound source, avatar 802. An (x,y) coordinate system can be superimposed at the origin of the sound source, avatar 802. The unit vector $u_A$ forms an angle $\phi$ with the vector (−1,0) of the (x,y) coordinate system, as shown in FIG. 8. A participant A, through the graphical user interface, can adjust the orientation of the avatar using the pointing device used for moving the avatar 802 in virtual space or through a physical input device. There are various ways a participant A could specify the angle $\phi$, for example, by rotating a dial on the screen with the mouse, or by turning a dial on a physical input device.

Figure 9:
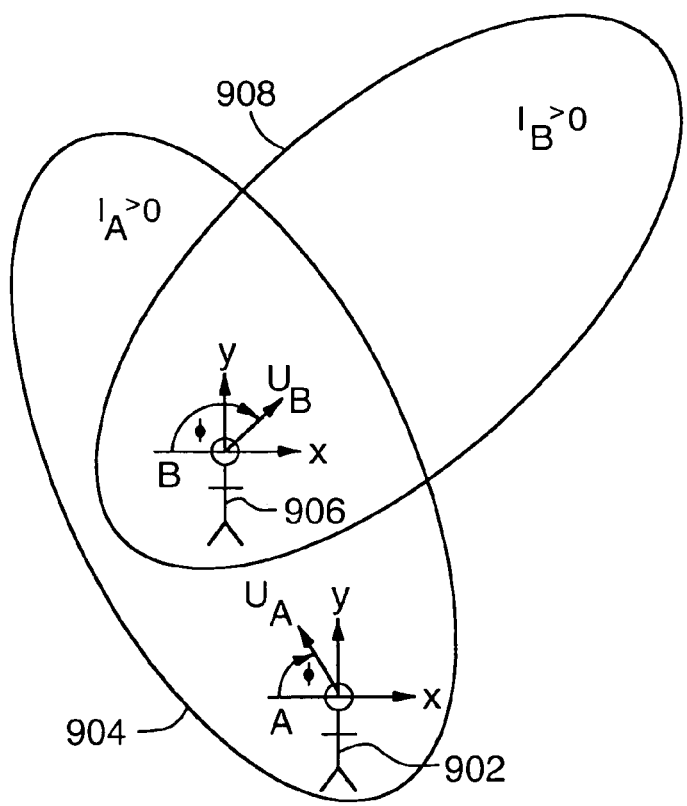
FIG. 9 is a representation of directional sound distribution illustrating two participants.

Turning to FIG. 9, an example illustrating the directionality of sound from two participants is shown.

Participants can only hear each other when they are in each other's range. In FIG. 9, participant A is represented by avatar 902 on a graphical user interface, which has a directional sound distribution represented by ellipse 904. Likewise, participant B is represented by avatar 906 which has a directional sound distribution represented by ellipse 908. The determination of whether participant B can hear participant A is whether avatar 906 of participant B is inside ellipse 904 describing participant A's sound distribution. As can be seen from FIG. 9, avatar 906 of participant B is inside ellipse 904 of participant A, therefore, participant B can hear the sound emanating from participant A. In contrast, avatar 902 of participant A is not within the ellipse 908 of participant B, therefore, participant A cannot hear sound emanating from participant B.

Eavesdropping on conversations can be defined in terms of a table. Table 3 illustrates when a third participant would be able to eavesdrop on the conversation between two other participants. A participant represented by an avatar is said to be able to "eavesdrop" into another conversation if it is located sufficiently "close" the avatars representing the parties involved in the conversation.

TABLE 3

|  | $I_A = 0$ | $I_A < 0$ |
|---|---|---|
| $I_B = 0$ | NO | NO |
| $I_B < 0$ | NO | YES |

Figure 10A:
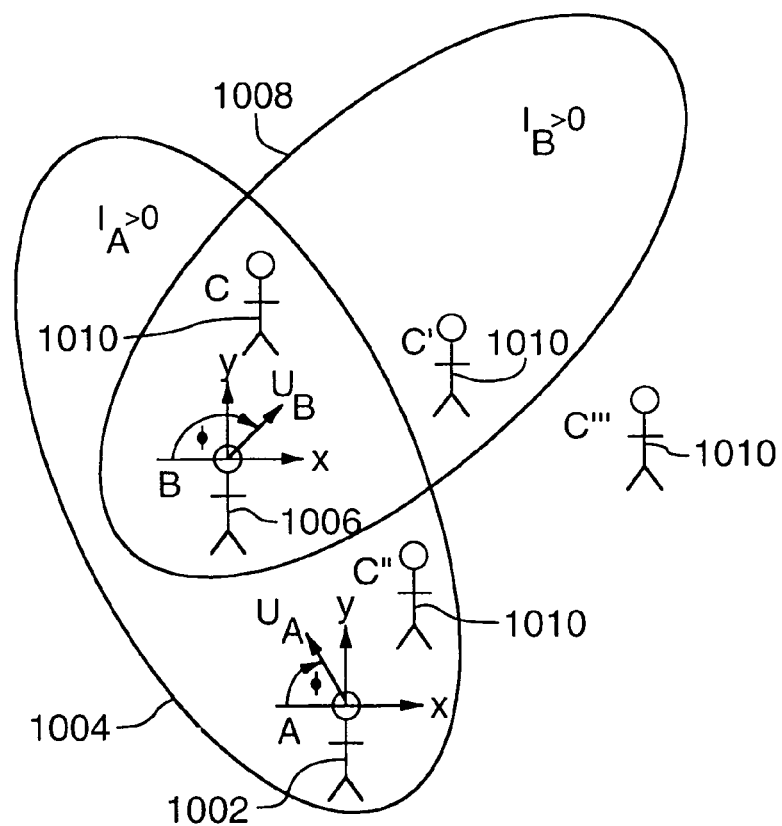
FIG. 10A is a representation of directional sound distribution illustrating eavesdropping by a third participant.

Table 3 indicates that in order for a third participant to eavesdrop on the conversation between two other participants, A and B, the intensities $I_A$ and $I_B$, as measured at the location of the third participant, must both be greater than 0. Another way of stating this is that third must be in the intersection of the elliptical sound distributions for A and B. Assuming that the intensity is set to 0 outside of the ellipse for computational efficiency. Turning to FIG. 10A, the eavesdropping of a third participant on the conversation of two other participants is illustrated using a directional sound distribution. In FIG. 10A, participant A is represented by avatar 1002 on a graphical user interface, which has a directional sound distribution represented by ellipse 1004. Likewise, participant B is represented by avatar 1006 which has a directional sound distribution represented by ellipse 1008. A third participant C which wishes to eavesdrop, represented by avatar 1010 is shown in four positions: C, C', C'' and C''' respectively. With avatar 1010 at position C''', neither participant A nor participant B are audible to participant C. At position C''', as avatar 1010 approaches avatar 1002, participant A becomes audible, but not participant B. With avatar 1010 at position C', participant B becomes audible, but not participant A. With avatar 1010 at position C, both participant A and participant B (i.e. the conversation) become audible as avatar 1010 is in the boundary defined by the intersection of the two sound distribution ellipses 1004 and 1008.

This can also be represented by a table. Table 4 below, which is similar to Table 3, illustrates how sound can provide a navigational cue.

TABLE 4

|  | $I_A = 0$ | $I_A < 0$ |
|---|---|---|
| $I_B = 0$ | C''' | C'' |
| $I_B < 0$ | C' | C |

Tables 3 and 4 can be generalized to multiple avatars in an obvious manner.

The intensity of sound experienced at a position B relative to sound source at position A for a directional sound model can be determined numerically. A's sound distribution as measured at point b is defined by the origin of the sound source a and parameters $u_A$, $max_A$, $min_A$ and $N_A$, as discussed above with respect to FIGS. 7 to 9. This approximation assumes that the attenuation factor $N_A$ has been chosen such that the sound intensity from a participant at location A is above an audibility threshold. We can select a value of $\lambda$ such that at the boundary of the ellipse, the intensity will be $1/N_A$ of the initial intensity. To simplify the calculations, we can set the sound intensity from a sound source A to zero outside A's ellipse. This is a practical assumption that reduces the computational effort required for computing the various sound distributions.

The formula for the attenuation at a point b with regard to a sound source in a is:

$$A(x_B, y_B) = \frac{1}{1 + (N_A - 1)\frac{(b-a)(b-a)}{r(max_A, min_A, \pi - \omega)^2}}$$

where $$\omega = \arccos \frac{(b-a)u_A}{\sqrt{(b-a)(b-a)}} \text{ and}$$

$$r(max, min, \phi) = \frac{2 max\, min}{max + min + (max - min)\cos\phi}$$

When point B is at the periphery of the ellipse, we get—according to the definition of real-time distance:

$$A(x_B, y_B) = \frac{1}{1 + (N-1)(1)}$$

The intensity is simply the product of the base intensity of the sound source and the attenuation at the point for which the intensity is computed.

Figure 10B:
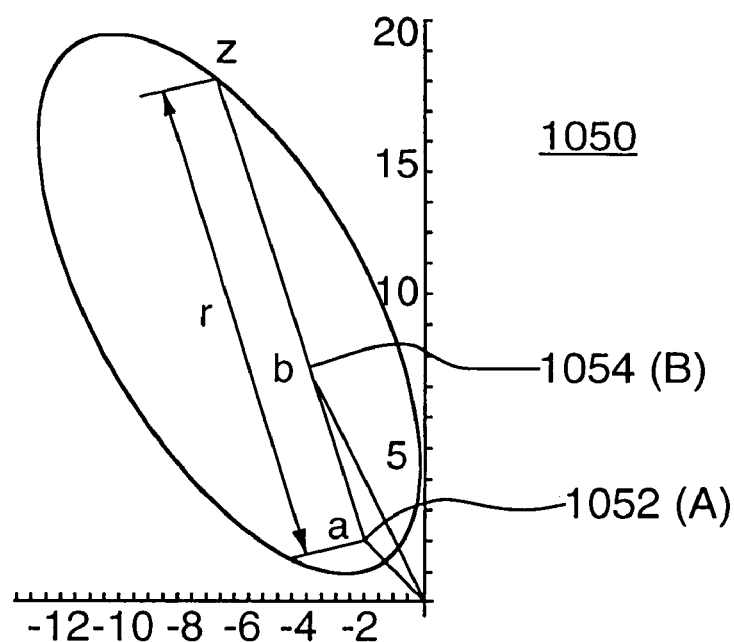

The attenuation can be illustrated by example as shown in FIG. 10B. FIG. 10B shows a graphical representation 1050 with sound sources A (1052) and B (1054). Assume sound source A (1052) is located at a=(-2,2), with a base intensity of 3 and has a forward range of 20, a backward range of 1, and an orientation of 60° (degrees) or p/3 (radians) from the −x axis and decay factor N=5. Sound source B (1054) is located at b=(-4,8), and has a forward range of 10, a backward range of 5, and an orientation of 270° (degrees) or 3p/2 (radians).

The unit vector u for the directional sound source at A (1052) is given by:

$$u = \{-\cos[\pi/3], \sin[\pi/3]\} = \left\{-\frac{1}{2}, \frac{\sqrt{3}}{2}\right\} = \{-0.5, 0.866025\}$$

Continuing the example, we can calculate the common terms as set out below.

$$b - a = (-4 - (-2), (8-2) = \{-2, 6\}$$

$$(b-a) \cdot u = \{-2, 6\} \cdot \left\{-\frac{1}{2}, \frac{\sqrt{3}}{2}\right\} = 1 + 3\sqrt{3} = 6.19615$$

$$(b-a) \cdot (b-a) = \{-2, 6\} \cdot \{-2, 6\} = (-2)(-2) + (6)(6) = 40$$

Further continuing the example, we can calculate $\omega$ as set out below.

First we compute the angle $\omega$ between b-a and u. This angle is then used as input to the formula for r, the real-time distance between A and B.

The cosine of $\omega$ becomes:

$$\cos(\omega) = \frac{(b-a) \cdot u}{\sqrt{(b-a) \cdot (b-a)}} = \frac{1 + 3\sqrt{3}}{\sqrt{40}} = \frac{1 + 3\sqrt{3}}{2\sqrt{10}} = 0.979698$$

Thus we obtain $\omega$.

$$\omega = \text{ArcCos}[0.979698] = 0.201848$$

From the above, we can perform the calculation of r(max, min,$\phi$)

where $\phi = \pi - \omega$.

$$\phi = \pi - \omega = 3.141593 - 0.201848 = 2.93974$$

Continuing the example where max=20 and min=1, plugging into the formula for r, we obtain:

$$\frac{2\,max\,min}{max + min + (max - min)\cos[\varphi]} =$$
$$\frac{2(20)(1)}{20 + 1 + (20 - 1)\cos(2.93974)} = 16.7663$$

Alternatively, from geometry we know that $\cos(\pi-\omega) = -\cos\omega$. Although, above we computed the value of $\omega$ for clarity, in fact, to reduce the calculations, we only need to compute the cos $\omega$, and can avoid recomputing the cosine of $\pi-\omega$ in the formula for r. We thus could have computed r more simply as follows:

$$\frac{2\,max\,min}{max + min - (max - min)\cos[\omega]} =$$
$$\frac{2(20)(1)}{20 + 1 - (20 - 1)\cos(0.201848)} = 16.7663$$

Calculation of the Attenuation at Point B

The sound intensity drops proportionally to the square of the real-time distance from the sound source. Since, mathematically, the intensity never actually drops to 0, we select the decay factor $\lambda$ such that the attenuation at the boundary of ellipse will be 1 N-th of initial intensity. N should be chosen such that for attenuations larger than an N-fold reduction the sound is below the audibility threshold. This threshold may be a parameter that the user or an administrator can set through graphical user interface during a calibration phase.

The formula, as previously discussed, for computing the attenuation at point B is:

$$A(x_B, y_B) = \frac{1}{1 + (N_A - 1)\frac{(b-a)(b-a)}{r(\max_A, \min_A, \pi - \omega)^2}}$$

If we choose N=5, plugging in the intermediate results from above, we have an attenuation $A(x_B, y_B)$ of:

$$\frac{1}{1 + (5-1)(40)/(16.7663)^2} = .637277$$

Calculation of the Sound Intensity at Point B

Assuming a base intensity at point A of 3, the sound intensity at I $(x_B, y_B)$ point B is:

(base intensity of A)*(attenuation at point B)

$$I(x_B, y_B) = A * A(x_B, y_B) = 3 * 0.637277 = 1.91183$$

Where there are multiple sound sources, then the total intensity at any point is merely the sum of the sound intensities from each source, a similar and obvious adaptation of the procedure described with respect to Table 2 and the calculation example above.

Extensions

The invention is not limited to a single virtual room, but applies similarly to several floors with connected rooms. However, some modifications to the way sound propagation is computed would be appropriate in this case in order to make the computation more efficient. In this scheme, a room can be treated as a single sound source to locations outside the room. That is, the new sound source is not used for sound propagation computations inside the room.

Figure 11:
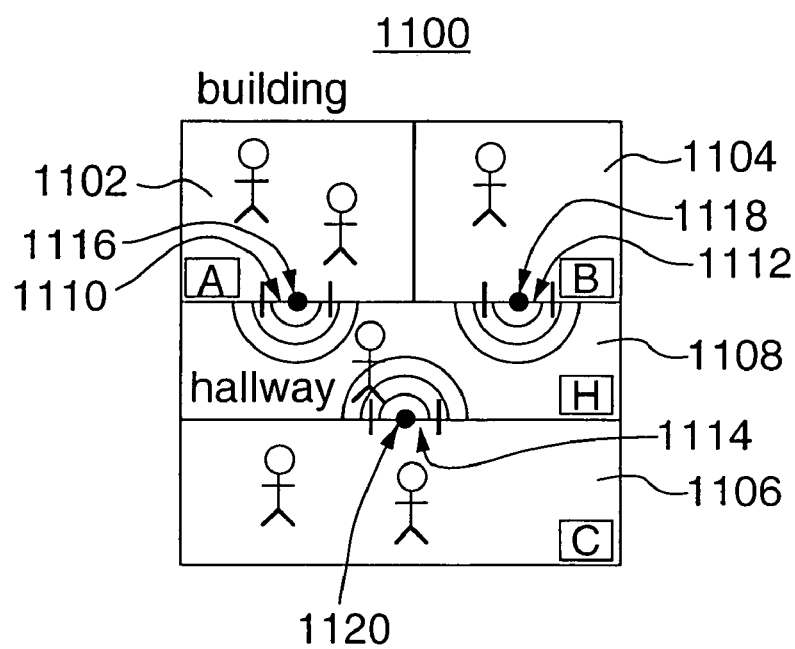
FIG. 11 is a representation of an alternate embodiment of the present invention where multiple rooms on the floor of a virtual building are illustrated.

FIG. 11 shows one floor 1100 of a virtual building with rooms 1102, 1104, 1106 and 1108 that are connected through doors 1110, 1112 and 1114 respectively. A room (1102, 1104, 1106) can be connected to several other rooms at the same time, such as room 1108, which is the virtual equivalent of a shared hallway.

Each room 1102, 1104, 1106 and 1108 is represented by an equivalent sound source that has an initial intensity A equal to the intensity that would be experienced by an avatar located in the center of the door to the room as indicated by the points 1116, 1118 and 1120 respectively. If a room has multiple doors, such as room 1108, it is represented by as many equivalent sound sources such as points 1116, 1118 and 1120. This simplification is reasonable since the sound does not propagate through the door in the same manner as in free space inside the room. At the same time, this provides a better approximation of the sound distribution in a physical building than that obtained by assuming that the sound does not propagate beyond the doors of a room. In this manner, an avatar can move throughout virtual rooms, floors and buildings and eavesdrop and participate in numerous conversations of interest.

Figure 12:
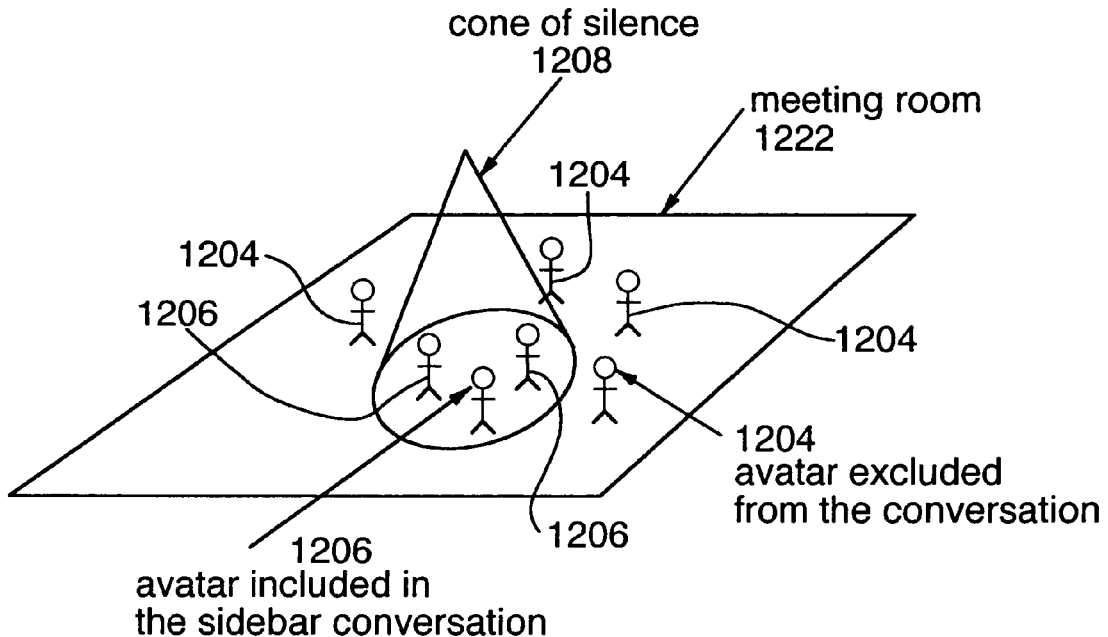
FIG. 12 is a representation of an alternate embodiment of the present invention where a sidebar conversion is shown.

Turning to FIG. 12, an alternate embodiment of the present invention where a sidebar conversation held within a "cone of silence" is shown. Avatars 1204 and 1206 are present in meeting room 1202 with the participants represented by Avatars 1206 engaged in a private sidebar conversation, shown as within cone-of-silence 1208. The participants represented by Avatars 1204 are not participants in the side bar conversation, and are shown outside cone of silence 1208.

The participants represented by Avatars 1204 excluded from the sidebar conversation will only hear a strongly attenuated version of the sound of the sidebar (conversation such that the sound generated is just above a level of being audible. These gives the participants corresponding to Avatars 1204 the sense that there is a conversation between the sidebar participants represent by Avatars 1206, but does not allow them to eavesdrop on it. The method for dismissing the sound generated for the participants represented by avatars 1206 would be as previously described with respect to FIGS. 1-10.

The participants represented by Avatars 1204 can be included in a sidebar conversation by selecting them in the graphical representation of the virtual meeting room 1202. Any single participant can start a sidebar conversation. Mechanisms, using an appropriate check box window, similar to the meeting room inspection window 518 of FIG. 5 may be put in place to allow only current participants in a sidebar conversation to add new participants.

Figure 13:
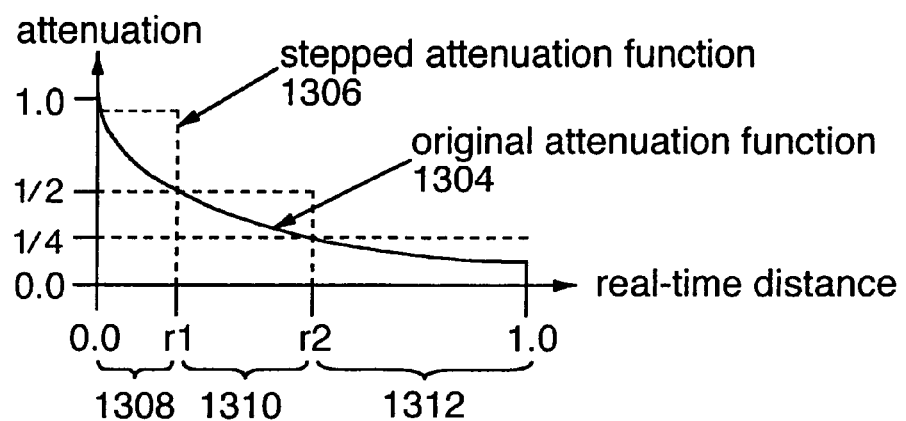
FIG. 13 is a graphical representation of an alternate embodiment illustrating where the real-time distance range from sound source is divided into intervals.

Turning to FIG. 13, an alternate embodiment of the present invention is shown in graph 1302 where the real-time distance is divided into intervals. This can be used to simplify the calculations where calculation efficiency is important by dividing the real-time distance range into a number of intervals and computing only one attenuation value per interval as shown in graph 1302 of FIG. 13. Graph 1302 shows the original attenuation function 1304 and a stepped attenuation function 1306. The value calculated for the interval is then the attenuation applied to all locations whose distance from the sound source falls within that interval.

One can take advantage of the division into intervals by selecting the intervals such that subsequent intervals are mapped to half the attenuation of the previous interval. This simplifies the computation of the attenuated sound, since now a floating-point division can be replaced by a shift right by one. One can easily see that the upper bound of the n-th interval can be computed by the following formula:

$$r_n = \sqrt{(2^n - 1)/(N - 1)}$$

For example, as shown in the graph 1302 of FIG. 13, assume we want to divide the real-time distance into three intervals, first interval 1308 which goes from 0.0 to r1, second interval 1310 which goes from r1 to r2, and third interval r3 which goes from r2 to 1.0, and the decay factor N=5. From the formula above, we obtain the interval values:

First Interval 1308: from 0 to $r1 = \sqrt{(2^1 - 1)/(5 - 1)} = 0.5$

Second Interval 1310: from r1=0.5 to $r2 = \sqrt{(2^2 - 1)/(5 - 1)} = 0.866$

Third Interval 1312: from r2=0.866 to 1

With centralized mixing in an MCU, this could be employed to further advantage as the same attenuated audio packet can be sent to all participants whose distance from the sound source falls within the same interval. If, for example, as in the graph of FIG. 13, we divide the real-time distance range into three intervals of attenuation 1, ½ and ¼, we need to attenuate an audio packet at most three times, not individually for each participant, no matter how many participants there are. This alternate embodiment reduces the computation necessary where the computation is performed centrally in an MCU and delivered to the user interfaces of the various participants.

In a further embodiment of the invention, several different locations associated with one user can be represented as virtual meeting rooms. These can include the user's desktop at work, the desktop at home, the hotel room in which the user is staying, etc. This allows the user to define at which default locations it wants to be located and contacted for conversation. In this manner, avatars can be used as presence indicators that show the availability of people in a virtual community.

In a further embodiment, the invention can be extended to three-dimensional worlds. The notions of navigation cues and eavesdropping are the same. However, current 3D technologies still require the computing power of a high-end PC and, at the same time, currently only offer primitive user interfaces that are hard to navigate.

Although the invention has been described in terms of a preferred and several alternate embodiments, those skilled in the art will appreciate that other alterations and modifications can be made without departing from the sphere and scope of the teachings of the invention. All such alterations and modifications are intended to be within the sphere and scope of the claims appended hereto.

I claim:

1. A system for conducting a virtual audio-visual conference between two or more users comprising:
   two or more client stations each acting as a signal source and destination for each respective said user, having a user interface for audio-visual input and output including audio signal reception and generation means for receiving and generating audio signals,
   one or more servers; and
   a network coupling said client stations and said servers; wherein each said user is represented as a corresponding movable visual symbol displayed on said user interfaces of all coupled said client stations, and said audio signal of all said users is generated at each said client station with an attenuation according to the spatial position of respective said symbols on said user interfaces and according to the direction in which each movable visual symbol of each signal source is oriented on the user interface,
   wherein said attenuation of said audio signal according to spatial position is determined according to the formula:

$$\frac{1}{\lambda((x_R - x_S)^2 + (y_R - y_S)^2) + 1}$$

where $(X_S, Y_S)$ is the spatial position of said signal source and $(X_R, Y_R)$ is the spatial position of said signal destination and $\lambda$ is the parameter of how fast the signal decays.

2. The system of claim 1 wherein said attenuation according to the direction is further approximated by an ellipse defined by an original of said sound source at a point a which coincides with a focus of said ellipse, a forward range max, a backward range min and said direction in which said movable visual symbol of each said signal source is oriented is the unit vector $u_a$ as measured from the (x, y).

3. A system for conducting a virtual audio-visual conference between two or more users comprising:
   two or more client stations each acting as a signal source and destination for each respective said user, having a user interface for audio-visual input and output including audio signal reception and generation means for receiving and generating audio signals,
   one or more servers; and
   a network coupling said client stations and said servers; wherein each said user is represented as a corresponding movable visual symbol displayed on said user interfaces of all coupled said client stations, and said audio signal of all said users is generated at each said client station with an attenuation according to the spatial position of respective said symbols on said user interfaces and according to the direction in which each movable visual symbol of each signal source is oriented on the user interface,
   wherein said attenuation according to the direction is further approximated by an ellipse defined by an original of said sound source at a point a which coincides with a focus of said ellipse, a forward range max, a backward range min and said direction in which said movable visual symbol of each said signal source is oriented is the unit vector $u_a$ as measured from the (x, y).

4. The system of claim 3 wherein said attenuation according to the direction is further determined according to the formula:

$$\frac{1}{1 + (N_a - 1)\frac{(b-a)(b-a)}{r(\max_a, \min_a, \pi - \omega)^2}}$$

where:
   b is said sound destination point,
   $u_a$ forms an angle $\phi$ with the vector $(-1,0)$,
   $N_a$ is the parameter on how fast the signal decays, $$\omega = \arccos\frac{(b-a)u_A}{\sqrt{(b-a)(b-a)}}, \text{ and}$$

$$r(\max, \min, \phi) = \frac{2\max\min}{\max + \min + (\max + \min)\cos\phi}.$$

5. A method of conducting a virtual audio-visual conference between two or more users, each user having a user interface for audio-visual input or output including audio signal reception and generation means for receiving and generating audio signals, said method comprising the steps of:
   representing each user as a movable symbol displayed on said user interface;
   locating the position of a sound generating participant in said virtual conference;
   locating the position of a listening participant in said virtual conference;
   calculating the signal strength of said signal received from said generating participant at the position of said listening participant in said virtual conference based upon the distance between said sound generating participant and said listening participant in said virtual conference and upon the direction in which the sound generating participant is oriented in said virtual conference; and
   generating an output signal corresponding to said calculated signal strength,
   wherein said calculated signal strength based upon distance is determined with a uniform attenuation from said sound generating participant in said virtual conference, and wherein said attenuation is determined according to the formula:

$$\frac{1}{\lambda((x_R - x_S)^2 + (y_R - y_S)^2) + 1}$$

where $(X_S, Y_S)$ is said position of said sound generating participant and $(X_R, Y_R)$ is said position of said listening participant and $\lambda$ is the parameter on how fast said signal strength decays.

6. The method of claim 5 wherein said calculated signal strength based upon direction is determined with an attenuation that is approximated by an ellipse defined by an origin of said sound generating participant in said virtual conference at a point a which coincides with a focus of said ellipse, a forward range max, a backward range min and said direction in which said sound generating participant is oriented in said virtual conference is the unit vector $u_a$ as measured from the (x,y) axis of said virtual conference.

7. A method of conducting a virtual audio-visual conference between two or more users, each user having a user interface for audio-visual input or output including audio signal reception and generation means for receiving and generating audio signals said method comprising the steps of:
  representing each user as a movable symbol displayed on said user interface;
  locating the position of a sound generating participant in said virtual conference;
  locating the position of a listening participant in said virtual conference;
  calculating the signal strength of said signal received from said generating participant at the position of said listening participant in said virtual conference based upon the distance between said sound generating participant and said listening participant in said virtual conference and upon the direction in which the sound generating participant is oriented in said virtual conference; and
  generating an output signal corresponding to said calculated signal strength,
  wherein said calculated signal strength based upon direction is determined with an attenuation that is approximated by an ellipse defined by an origin of said sound generating participant in said virtual conference at a point a which coincides with a focus of said ellipse, a forward range max, a backward range min and said direction in which said sound generating participant is oriented in said virtual conference is the unit vector $u_a$ as measured from the (x,y) axis of said virtual conference.

8. The method of claim 7 wherein said attenuation that is approximated by an ellipse is further determined according to the formula:

$$\frac{1}{1 + (N_a - 1)\frac{(b-a)(b-a)}{r(\max_a, \min_a, \pi - \omega)^2}}$$

where:
  b is said position of said sound generating participant,
  $u_a$ forms an angle $\phi$ with the vector $(-1,0)$,
  $N_a$ is the parameter on how fast the signal decays, $$\omega = \arccos\frac{(b-a)u_A}{\sqrt{(b-a)(b-a)}}, \text{ and}$$

$$r(\max, \min, \phi) = \frac{2\max\min}{\max + \min + (\max + \min)\cos\phi}.$$

9. A method for generating a spatial audio signal in a virtual conference presented on a audio-visual device comprising the steps of:
  locating the position of a sound generating participant in said virtual conference;
  locating the position of a listening participant in said virtual conference;
  calculating the signal strength of said signal received from said generating participant at the position of said listening participant in said virtual conference based upon the distance between said sound generating participant and said listening participant in said virtual conference and based upon the direction in which said sound generating participant is oriented in said virtual conference, and
  generating an output signal corresponding to said calculated signal strength,
  wherein said calculated signal strength based upon distance is determined with a uniform attenuation from said position of said sound generating participant in said virtual conference, and
  wherein said attenuation is determined according to the formula:

$$\frac{1}{\lambda((x_R - x_S)^2 + (y_R - y_S)^2) + 1}$$

where $(X_S, Y_S)$ is said position of said sound generating participant and $(X_R, Y_R)$ is said position of said listening participant and $\lambda$ is the parameter of how fast said signal strength decays.

10. A method for generating a spatial audio signal in a virtual conference presented on a audio-visual device comprising the steps of:
  locating the position of a sound generating participant in said virtual conference;
  locating the position of a listening participant in said virtual conference;
  calculating the signal strength of said signal received from said generating participant at the position of said listening participant in said virtual conference based upon the distance between said sound generating participant and said listening participant in said virtual conference and based upon the direction in which said sound generating participant is oriented in said virtual conference, and
  generating an output signal corresponding to said calculated signal strength,
  wherein said calculated signal strength based upon direction is determined with an attenuation that is approximated by an ellipse defined by an origin of said sound generating participant in said virtual conference at a point a which coincides with a focus of said ellipse, a forward range max, a backward range min and said direction in which said sound participant is oriented in said virtual conference is the unit vector $u_a$ as measured from the (x, y) axis.

11. The method of claim 10 wherein said attenuation that is approximated by an ellipse is further determined according to the formula:

$$\frac{1}{1+(N_a-1)\frac{(b-a)(b-a)}{r(\max_a,\min_a,\pi-\omega)^2}}$$

where:
b is said position of said generating participant,
$u_a$ forms an angle $\phi$ with the vector $(-1,0)$,
$N_a$ is the parameter on how fast the signal decays, $$\omega = \arccos\frac{(b-a)u_A}{\sqrt{(b-a)(b-a)}}, \text{ and}$$

$$r(\max,\min,\phi) = \frac{2\max\min}{\max+\min+(\max+\min)\cos\phi}.$$

12. A system for conducting a virtual audio-visual conference between two or more users comprising:
two or more client stations each acting as a signal source and destination for each respective said user, having a user interface for audio-visual input and output including audio signal reception and generation means for receiving and generating audio signals,
one or more servers; and
a network coupling said client stations and said servers; wherein each said user is represented as a corresponding movable visual symbol displayed on said user interfaces of all coupled said client stations, and said audio signal of all said users is generated at each said client station with an attenuation according to the spatial position of respective said symbols on said user interfaces and according to the direction in which each movable visual symbol of each signal source is oriented on the user interface,
wherein said attenuation of said audio signal according to spatial position is determined uniformly from said spatial position of each said signal source, and
wherein said attenuation according to the direction is further approximated by an ellipse defined by an original of said sound source at a point a which coincides with a focus of said ellipse, a forward range max, a backward range min and said direction in which said movable visual symbol of each said signal source is oriented is the unit vector $u_a$ as measured from the (x, y).

13. A method of conducting a virtual audio-visual conference between two or more users each user having a user interface for audio-visual input or output including audio signal reception and generation means for receiving and generating audio signals, said method comprising the steps of:
representing each user as a movable symbol displayed on said user interface;
locating the position of a sound generating participant in said virtual conference;
locating the position of a listening participant in said virtual conference;
calculating the signal strength of said signal received from said generating participant at the position of said listening participant in said virtual conference based upon the distance between said sound generating participant and said listening participant in said virtual conference and upon the direction in which the sound generating participant is oriented in said virtual conference; and
generating an output signal corresponding to said calculated signal strength,
wherein said calculated signal strength based upon distance is determined with a uniform attenuation from said sound generating participant in said virtual conference, and
wherein said calculated signal strength based upon direction is determined with an attenuation that is approximated by an ellipse defined by an origin of said sound generating participant in said virtual conference at a point a which coincides with a focus of said ellipse, a forward range max, a backward range min and said direction in which said sound generating participant is oriented in said virtual conference is the unit vector $u_a$ as measured from the (x,y) axis of said virtual conference.

* * * * *